(12) United States Patent
Shima

(10) Patent No.: US 8,245,745 B2
(45) Date of Patent: Aug. 21, 2012

(54) PNEUMATIC TIRE HAVING LAND PORTION WITH BURIED REINFORCING MEMBER

(75) Inventor: Ichiro Shima, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 134 days.

(21) Appl. No.: 12/816,450

(22) Filed: Jun. 16, 2010

(65) Prior Publication Data

US 2011/0000594 A1  Jan. 6, 2011

(30) Foreign Application Priority Data

Jul. 3, 2009  (JP) ................... 2009-159118

(51) Int. Cl.
*B60C 9/20* (2006.01)

(52) U.S. Cl. ............... 152/209.5; 152/526; 152/538

(58) Field of Classification Search ............... 152/209.5, 152/526, 533, 209.1, 210, 211, 212, 538
See application file for complete search history.

(56) References Cited

U.S. PATENT DOCUMENTS

| | | | | |
|---|---|---|---|---|
| 3,018,810 A | * | 1/1962 | Barassi | 152/176 |
| 3,057,392 A | * | 10/1962 | Nallinger | 152/535 |
| 3,342,239 A | * | 9/1967 | Olagnier | 152/530 |
| 3,593,521 A | * | 7/1971 | Gardella et al. | 60/455 |
| 3,773,096 A | * | 11/1973 | Masson | 152/209.4 |
| RE28,424 E | * | 5/1975 | McGillvary | 152/452 |
| 4,244,415 A | * | 1/1981 | Peter et al. | 152/209.5 |
| 4,924,927 A | * | 5/1990 | Kawabata et al. | 152/531 |
| 5,593,521 A | * | 1/1997 | Iseki | 152/209.5 |

FOREIGN PATENT DOCUMENTS

| | | |
|---|---|---|
| JP | 2002-370509 | * 12/2002 |
| JP | 2006-103397 | 4/2006 |
| JP | 2006-188147 | * 7/2006 |
| JP | 2007-001401 | 1/2007 |

* cited by examiner

*Primary Examiner* — Steven D Maki
*Assistant Examiner* — Robert Dye
(74) *Attorney, Agent, or Firm* — Fish & Richardson P.C.

(57) ABSTRACT

A pneumatic tire is provided with a main groove extending along a tire circumferential direction, and a land portion comparted by the main groove in a tread surface. A reinforcing member having a cord which is inclined at an angle between 75 and 90 degrees with respect to the tire circumferential direction is buried in the vicinity of a groove bottom height of the main groove in an inner region of the land portion.

3 Claims, 2 Drawing Sheets

PNEUMATIC TIRE HAVING LAND PORTION WITH BURIED REINFORCING MEMBER

BACKGROUND OF THE INVENTION

1. Field of the Invention

The present invention relates to a pneumatic tire provided with a main groove extending along a tire circumferential direction, and a land portion comparted by the main groove, on a tread surface.

2. Description of the Related Art

In the circumstances that a consciousness relating to a global environment protection rises in recent years, a rolling resistance of a tire greatly contributes to a mileage performance of a vehicle, and it is necessary to effectively reduce this. Conventionally, there has been proposed a method of reducing the rolling resistance by changing a composition of a tread rubber, however, since it affects a wear resistance and a motion performance of the tire to no small extent, a method which can reduce the rolling resistance independently from the rubber composition is strongly desired.

In order to reduce the rolling resistance, it is important to suppress an energy loss at a time of rolling the tire, and a portion dominating the energy loss is mainly a tread portion. The present inventors have made an intense study, and have found that a strain of the tread rubber caused by a wiping deformation and a deformation of a tire annulus ring greatly takes a part in the energy loss in the tread portion, and an increase of the strain deteriorates the rolling resistance.

In general, when the tire is grounded, a force (also called as an in-plane contractive force) heading for a center portion is applied to an inner side of a ground surface, and the land portion of the tread surface deforms along a tire width direction. In the present specification, such a deformation of the land portion is called as a wiping deformation. The wiping deformation is generated in a whole of the ground surface, however, a great strain is particularly generated in the rubber in the periphery of a groove bottom of the main groove. Further, at a time of grounding, a lower portion of a tire T is pressed against a road surface G as shown in FIG. 5, the annular ring deforms rapidly in circumferential end portions 21 and 22 of the ground surface, and a local strain is generated in the rubber of the circumferential end portions 21 and 22.

In Japanese Unexamined Patent Publication No. 2006-103397, there is described a pneumatic tire in which a reinforcing layer is arranged in an outer periphery of a belt layer. The reinforcing layer is constructed by laminating two reinforcing plies each including a reinforcing element which is inclined at an angle between 5 and 30 degrees with respect to the tire circumferential direction. Further, in Japanese Unexamined Patent Publication No. 2007-1401, there is described a pneumatic tire in which a belt cover layer obtained by winding a reinforcing cord in a tire circumferential direction is arranged in an outer periphery of the belt layer. The belt cover layer is constructed by a belt full cover layer laminated in an outer periphery of the belt layer, and a split belt full cover layer laminated in an outer periphery thereof.

However, since the reinforcing element and the reinforcing cord extend approximately along the tire circumferential direction in the tire, the tire widely allows a deformation along the tire width direction of the land portion and greatly affects a rigidity change relating to a deformation in a circumferential end portion of the ground surface, and it is thought that there is hardly obtained an effect of preventing an increase of the strain of the tread rubber caused by the wiping deformation and the deformation of the tire annular ring. In the first place, the reinforcing layer and the belt cover layer mentioned above are structured such as to be laminated in the outer periphery of the belt layer so as to reinforce the belt layer, and can not sufficiently correspond to such a request as to reduce the rolling resistance.

SUMMARY OF THE INVENTION

The present invention has been made in view of the above circumstances, and an object of the present invention is to provide a pneumatic tire which can reduce a rolling resistance of a tire by preventing a strain of a tread rubber due to a wiping deformation and a deformation of a tire annular ring from being increased.

The object can be achieved by the following present invention. That is, the present invention provides a pneumatic tire provided with a main groove extending along a tire circumferential direction, and a land portion comparted by the main groove, in a tread surface, wherein a reinforcing member having a cord which is inclined at an angle between 75 and 90 degrees with respect to the tire circumferential direction is buried in the vicinity of a groove bottom height of the main groove in an inner region of the land portion.

In the reinforcing member where the cord is inclined at a high angle as mentioned above, a tension is generated in the cord and a rigidity in the tire width direction is increased at a time of applying an air pressure in an inner portion of the tire. In this pneumatic tire, since the reinforcing member is buried in an inner region of the land portion in the vicinity of a groove bottom height of the main groove, it is possible to accurately inhibit the land portion from deforming in the tire width direction and to prevent the strain of the tread rubber due to the wiping deformation from being increased. In addition, since the cord of the reinforcing member extends at a high angle, an influence of the rigidity change is small on the deformation in the circumferential end portion of the ground surface, and it is possible to prevent the local strain in the circumferential end portion from being increased. As a result, it is possible to prevent the strain of the tread rubber due to the wiping deformation and the deformation of the tire annular ring from being increased, and to reduce the rolling resistance of the tire.

In the present invention, it is preferable that the reinforcing member is provided so as to have the same width as or be narrower than the land portion, and is arranged so as to avoid the inner region of the groove bottom of the main groove. In order to prevent the strain of the tread rubber due to the wiping deformation from being increased, it is sufficient to arrange the reinforcing member in the inner region of the land portion, and even if the reinforcing member is arranged in the inner region of the groove bottom of the main groove, it does not contribute to the reduction of the rolling resistance very much. Further, in order to execute a step of forming the main groove on the tread surface without trouble at a time of manufacturing the tire, the structure as mentioned above is advantageous.

In the present invention, it is preferable that the tread rubber has a cap base structure where a base rubber is laminated in an inner periphery of a cap rubber having the main groove, and the reinforcing member is interposed between the cap rubber and the base rubber. According to the structure mentioned above, it is possible to simply arrange the reinforcing member at a suitable height within the tread rubber, that is, in the vicinity of the groove bottom height of the main groove.

DETAILED DESCRIPTION OF THE PREFERRED EMBODIMENTS

Figure 1:
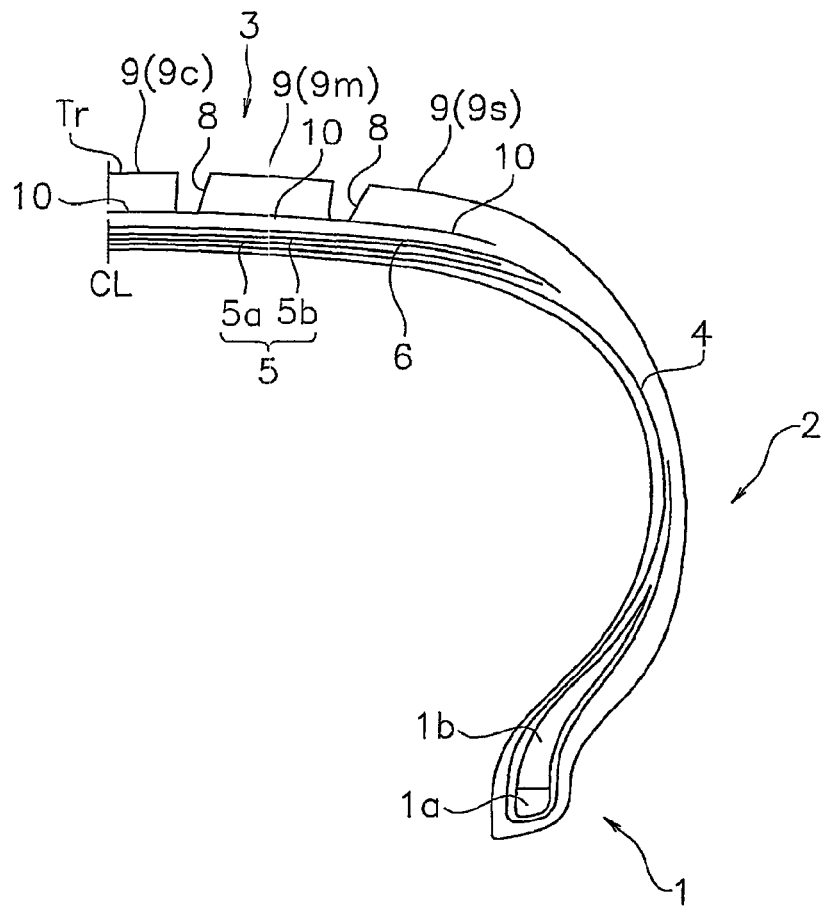
FIG. 1 is a half cross sectional view of a tire meridian showing one example of a pneumatic tire according to the present invention.
Figure 2:
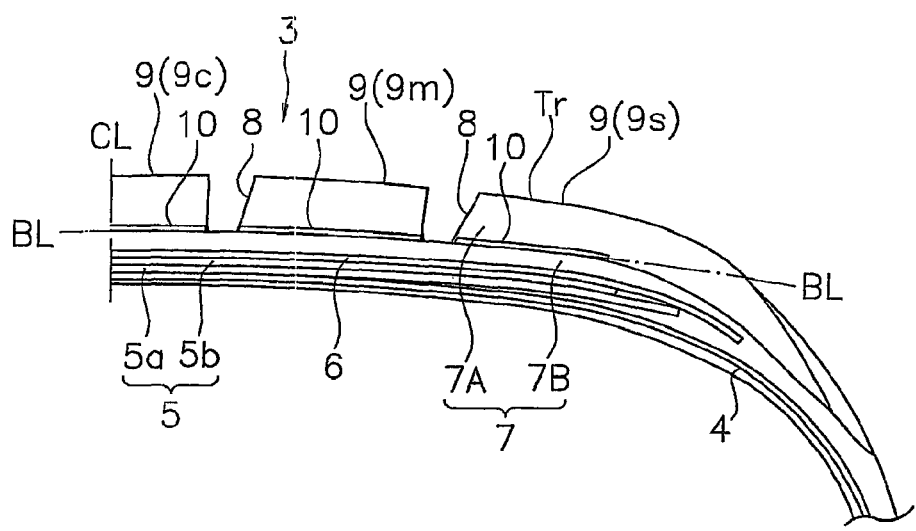
FIG. 2 is an enlarged view showing a substantial part of the tire in FIG. 1.
Figure 3:
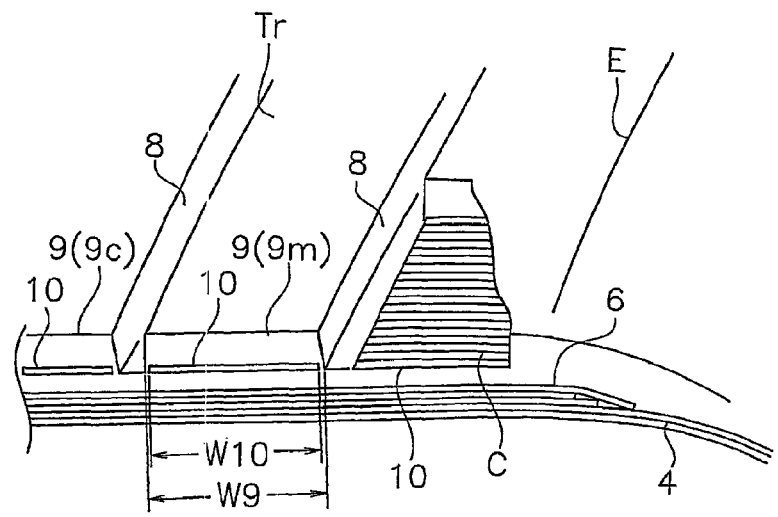
FIG. 3 is a perspective view showing the substantial part of the tire in FIG. 1 by rupturing partly.

An embodiment of the present invention will be explained with reference to the drawings. FIG. 1 is a half cross sectional view of a tire meridian showing one example of a pneumatic tire according to the present invention. FIG. 2 is an enlarged view showing a substantial part of the tire. FIG. 3 is a perspective view showing the substantial part of the tire by rupturing partly;

A pneumatic tire is a radial tire which is provided with a pair of annular bead portions 1, side wall portions 2 extending to an outer side in a tire diametrical direction from the bead portions 1, a tread portion 3 connected to outer peripheral side ends of the wide wall portions 2, and a carcass layer 4 reinforcing between the pair of bead portions 1. The carcass layer 4 is constructed by a carcass ply of a toroidal shape, and an end portion thereof is folded back in such a manner as to pinch a bead core 1a and a bead filler 1b.

A belt layer 5 reinforcing the carcass layer 4 on the basis of a hoop effect is arranged in an outer periphery of the tread portion 3 of the carcass layer 4, and a belt reinforcing layer 6 is laminated in an outer periphery of the belt layer 5. The belt layer 5 has two belt plies 5a and 5b each having a cord which is inclined at an angle between 20 and 30 degrees with respect to a tire circumferential direction, and each of the plies is laminated in such a manner that the cord intersects inversely to each other. The belt reinforcing layer 6 has a plurality of reinforcing cords extending substantially in parallel to the tire circumferential direction.

A tread rubber 7 is provided in an outer peripheral side of the belt reinforcing layer 6, and a tread surface Tr corresponding to an outer peripheral surface thereof is provided with a main groove 8 extending along the tire circumferential direction and a land portion 9 comparted by the main groove 8. The land portion 9 is constructed by a rib extending continuously in the tire circumferential direction, or a plurality of blocks. In the latter case, the land portion 9 is segmented in the tire circumferential direction by a lateral groove extending in a direction intersecting the main groove 8. The tread rubber 7 has a cap base structure where a base rubber 7B is laminated in an inner periphery of a cap rubber 7A having the main groove 8.

In the present embodiment, totally four main grooves 8 are formed in the tread surface Tr in increments of two in one side, and the land portion 9 includes a center land portion 9c in the vicinity of a tire equator CL, a shoulder land portion 9s provided closer to an outer side in the tire width direction than a pair of the main grooves 8 positioned in an outermost side, and a mediate land portion 9m interposed between them. The number of the main grooves 8 is exemplified by two to five, the number of the land portion 9 comes to three to six in correspondence thereto, and there is a case that the land portion is constructed by the center land portion and the shoulder land portion.

In an inner region of the land portion 9, a reinforcing member 10 is buried in the vicinity of a groove bottom height BL of the main groove 8. The reinforcing member 10 has a cord C which is inclined at an angle between 75 and 90 degrees with respect to the tire circumferential direction, and is formed by rubber coating a plurality of cords C which are arranged in parallel like a bamboo blind. As a material of the cord C, an organic fiber such as a nylon, an aramid, a polyester, a rayon or the like is exemplified, and it is possible to employ a material having an equivalent physical property with that of the cord member included in the general belt reinforcing layer. The reinforcing member 10 extends in the tire circumferential direction while forming a band shape, and the reinforcing member 10 is independently arranged in correspondence to each of the land portions 9 in the present embodiment.

The reinforcing member 10 buried in the vicinity of the groove bottom height. BL is positioned while being provided with a distance with respect to the belt reinforcing layer 6, and reinforces a root portion of the land portion 9. The groove bottom height BL is a height where a deepest end of the main groove 8 is positioned, and extends along a profile of the tread portion 3. An interface between the cap rubber 7A and the base rubber 7B is formed at an equivalent height with the groove bottom height BL, and the same applies to the general tread rubber having the cap base structure. In the present embodiment, the reinforcing member 10 is interposed between the cap rubber 7A and the base rubber 7B, and the reinforcing member 10 keeps away from the belt reinforcing layer 6 at a thickness of the base rubber 7B.

When the air pressure is filled in the inner portion of the tire, the tension is generated in the cord C which is inclined at the high angle as mentioned above, and a rigidity in the tire width direction of the reinforcing member 10 is increased. Accordingly, an inner region of the land portion 9 is reinforced in the vicinity of the groove bottom height BL, it is possible to accurately inhibit the land portion 9 from being deformed in the tire width direction, and it is possible to prevent the strain of the tread rubber 7 due to the wiping deformation from being increased. Further, since the cord C extends at a high angle, an influence of the rigidity change is small on the deformation in the circumferential end portion of the ground surface, and it is possible to prevent the local strain in the circumferential end portion from being increased. As a result, it is possible to prevent the strain of the tread rubber 7 due to the wiping deformation and the deformation of the tire annular ring from being increased, and to reduce the rolling resistance of the tire.

It is preferable that the reinforcing member 10 is provided so as to have the same width as or be narrower than the land portion 9, and is arranged while avoiding the inner region of the groove bottom of the main groove 8. In the present invention, the reinforcing member 10 may be arranged in the inner side of the groove bottom of the main groove 8, however, it is necessary to form the main groove 8 by pressing a projection provided in a mold against the tread surface Tr at a time of manufacturing the tire, and in order to execute such a step without trouble, it is desirable that the reinforcing member 10 is lacking in the inner region of the groove bottom of the main groove 8.

Figure 4:
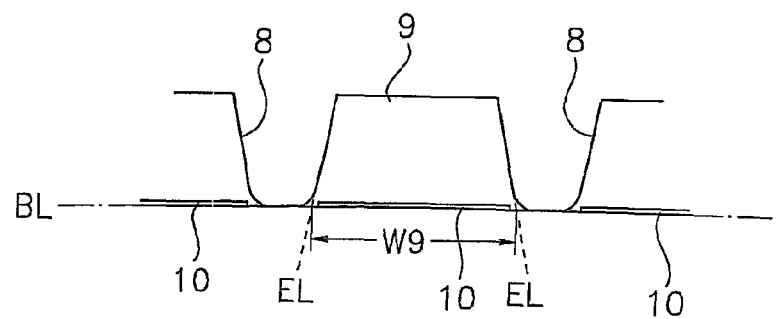
FIG. 4 is a cross sectional view showing a periphery of a main groove.
Figure 5:
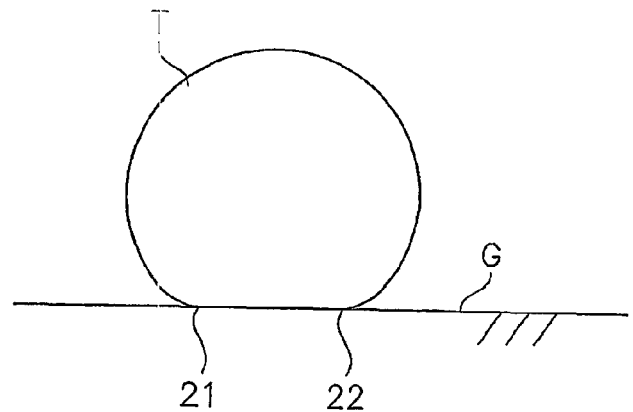
FIG. 5 is a side elevational view schematically showing a grounded state of the tire.

In the above, a width W9 of the land portion 9 is measured at the groove bottom height BL. In the case that the groove bottom is formed as a circular arc shape, it is measured at the groove bottom height BL in the same manner by using an extension line EL of the groove wall of the main groove 8 as shown in FIG. 4. In the light of sufficiently reinforcing the land portion 9, a width W10 of the reinforcing member 10 is preferably equal to or more than 50% and more preferably equal to or more than 75% of the width W9 of the land portion 9 corresponding thereto. For the same reason, an end portion of the reinforcing member 10 is preferably arranged within 5 mm from the groove wall of the main groove 8, and more preferably arranged within 1 mm. It is useful for securing a durability to prevent the end portion of the reinforcing member 10 from being exposed to the groove wall.

A width of the shoulder land portion 9s may be measured on the basis of a position of a ground end E. The ground end E indicates an outermost position in a tire axial direction grounding on the road surface at a time of rim assembling in a normal rim, placing the tire vertically on a flat road surface in a state where a normal internal pressure is applied, and applying a normal load. The normal load and the normal internal pressure are set to a maximum load (a design normal load in the case of a tire for a passenger car) defined in JISD4202 (data of an automotive tire) or the like, and a corresponding air pressure to this, and the normal rim is a standard rim defined in JISD4202 or the like as a general rule.

In the motion of the land portion 9 at a time of the wiping deformation, since the groove bottom of the main groove 8 acts as a fulcrum, it is possible to effectively suppress the deformation of the land portion 9 by the reinforcing member 10 arranged in the vicinity of the groove bottom height BL. The arrangement of the reinforcing member 10 is not limited to the just above the groove bottom height BL, but may be offset somewhat. In order to securely suppress the deformation of the land portion 9, in a case that the reinforcing member 10 is offset to the inner surface side of the tire, a distance with respect to the groove bottom height BL is preferably equal to or less than 1 mm, and inversely in a case that it is offset to the tread surface side, it is preferable that the reinforcing member 10 do not go beyond TWI (a tread wear indicator which is not illustrated). The TWI is a projection provided in the groove bottom of the main groove 8 for informing of a tire replacement time due to a wear.

In the present embodiment, there is shown an example where the reinforcing member 10 is arranged in all the land portions 9, however, it is sufficient to arrange the reinforcing member 10 at least in one land portion 9, and it is preferable that the reinforcing member 10 is arranged at least in an inner region of the shoulder land portion 9s. Since the force (in-plane contractive force) causing the wiping deformation is larger toward an outer side in the tire width direction within the ground surface, it is possible to effectively reduce the rolling resistance by providing the reinforcing member 10 in the shoulder land portion 9s where the motion is comparatively great. Further, the reinforcing effect in the shoulder land portion 9s may be enhanced by enlarging an end number (a cord number per unit length) of the reinforcing member 10 in the order of the shoulder land portion 9s, the mediate land portion 9m and the center land portion 9c.

The pneumatic tire in accordance with the present invention is the same as the conventional pneumatic tire except that the reinforcing member as mentioned above is provided in the tread portion, and the known material, shape, structure, manufacturing method and the like can be applied to the present invention.

Other Embodiments (1) The present invention is not limited to the embodiment mentioned above, but can be improved and modified variously within the scope of the present invention. Accordingly, it is possible to appropriately change the tread pattern formed on the tread surface in correspondence to the employed intended use and condition, and a zigzag-shaped main groove may be employed in place of the straight-shaped main groove.

(2) In the embodiment mentioned above, there is shown the example where the tread rubber has the cap base structure, however, the present invention is not limited to this, for example, the reinforcing member as mentioned above may be buried with respect to a single layer tread rubber. In this case, the tread rubber may be formed in accordance with a so-called ribbon winding construction method, and the reinforcing member may be arranged in the vicinity of the groove bottom height of the main groove in process of manufacturing.

EXAMPLE

An example tire which concretely shows the structure and effect of the present invention will be explained. A measurement was carried out by setting evaluation items in the examples or the like as follows.

(1) Rolling Resistance

The tire was assembled in a rim having a size 15×6.5JJ, an internal pressure 210 kPa thereafter was filled, a load 4.4 kN was set, and the rolling resistance was measured in accordance with US Society of Automotive Engineers SAE testing method J1269. A result of a comparative example 1 is set to 100 so as to be indexed, and the larger numerical value indicates the lower rolling resistance.

(2) Steering Stability

The test tire was installed to the vehicle so as to execute a cornering travel, a braking and the like, and was evaluated in accordance with a subjective test of a driver. A result of the comparative example 1 is set to 100 so as to be indexed, and the larger numerical value indicates the more excellent steering stability.

The comparative examples 1 to 4 and examples 1 to 4 have tire structures shown in Table 1 and FIG. 1, and their sizes are 195/65R15 81H. In the comparative example 1, the reinforcing member is not buried in the vicinity of the groove bottom height of the main groove, and in the example 3, the reinforcing member is buried only in the inner region of the shoulder land portion. Further, in the example 4, the reinforcing member is slightly offset from the groove bottom height of the main groove. The comparative example 4 is the same as the comparative example 1 except that a rubber composition having a lower energy loss is employed in the tread rubber. Results of the evaluation are shown in Table 1.

TABLE 1

|  | comparative example 1 | example 1 | example 2 | example 3 | example 4 | comparative example 2 | comparative example 3 | comparative example 4 |
|---|---|---|---|---|---|---|---|---|
| reinforced land portion | without | all | all | shoulder | all | all | all | without |
| cord angle | — | 90° | 75° | 90° | 90° | 0° | 60° | — |
| buried | — | Groove | Groove | Groove | 1 mm to tire | Groove | Groove | — |

TABLE 1-continued

| | comparative example 1 | example 1 | example 2 | example 3 | example 4 | comparative example 2 | comparative example 3 | comparative example 4 |
|---|---|---|---|---|---|---|---|---|
| height | | bottom height | bottom height | bottom height | inner surface side from groove bottom height | bottom height | bottom height | |
| rolling resistance | 100 | 105 | 103 | 102 | 102 | 96 | 98 | 105 |
| steering stability | 100 | 100 | 100 | 100 | 100 | 101 | 100 | 95 |

From Table 1, it is understood that the rolling resistance can be reduced in the examples 1 to 4 in comparison with the comparative examples 1 to 3. On the contrary, in the comparative examples 2 and 3 where the cord angle of the reinforcing member is low, the rolling resistance is deteriorated, the deformation of the land portion is widely allowed, and it is thought that the rigidity change greatly affects with regard to the deformation in the circumferential end portion of the ground surface. Further, in the comparative example 4, the steering stability is deteriorated by changing the composition of the tread rubber.

What is claimed is:

1. A pneumatic tire provided with a main groove extending along a tire circumferential direction, and a land portion comparted by the main groove, in a tread surface, wherein a single reinforcing member having a cord which is inclined at an angle between 75 and 90 degrees with respect to the tire circumferential direction is buried in an inner region of the land portion, namely, the reinforcing member is buried just above the groove bottom height, or is offset to an inner surface side of the tire with a distance from the groove bottom height of 1 mm or less, or is offset to the tread surface side from the groove bottom height by not more than a height of a tread wear indicator, and the reinforcing member has the same width in the tire width direction as, or is narrower than, the land portion and is arranged in such a way as to avoid an inner region of the groove bottom of the main groove.

2. The pneumatic tire according to claim 1, wherein the tread rubber has a cap base structure where a base rubber is laminated in an inner periphery of a cap rubber having the main groove, and the reinforcing member is interposed between the cap rubber and the base rubber.

3. The pneumatic tire according to claim 1, wherein the reinforcing member is arranged in the inner region of all parts of the comparted land portion.

* * * * *